United States Patent [19]

Saidla

[11] Patent Number: 4,476,076

[45] Date of Patent: * Oct. 9, 1984

[54] METHOD OF OPEN FORMING AN EXPANDED POLYESTER RESIN ARTICLE INVOLVING A CONTROLLED INDUCTION PERIOD

[75] Inventor: Glen W. Saidla, Stratham, N.H.

[73] Assignee: Whitney & Company, Inc., Stratham, N.H.

[*] Notice: The portion of the term of this patent subsequent to Nov. 9, 1999 has been disclaimed.

[21] Appl. No.: 291,404

[22] Filed: Aug. 10, 1981

Related U.S. Application Data

[63] Continuation-in-part of Ser. No. 111,664, Jan. 14, 1980, Pat. No. 4,358,548, and Ser. No. 215,200, Dec. 10, 1980, abandoned.

[51] Int. Cl.³ ............................................. B29D 27/04
[52] U.S. Cl. ..................... 264/45.3; 156/169; 264/45.5; 264/45.7; 264/257; 521/90; 521/99; 521/116
[58] Field of Search ............... 264/45.3, 45.7, 45.5, 264/257, DIG. 83; 521/99, 116, 90; 156/169

[56] References Cited

U.S. PATENT DOCUMENTS

| | | | |
|---|---|---|---|
| 2,972,554 | 2/1961 | Muskat et al. | 264/45.3 X |
| 3,025,202 | 3/1962 | Morgan et al. | 264/45.3 |
| 3,028,284 | 4/1962 | Reeves | 264/257 |
| 3,050,427 | 8/1962 | Slayter et al. | 264/45.3 X |
| 3,052,927 | 9/1962 | Hoppe et al. | 264/45.3 X |
| 3,082,486 | 3/1963 | Khawam et al. | 264/257 X |
| 3,256,218 | 6/1966 | Knox | 264/45.3 X |
| 3,285,866 | 11/1966 | Gmitter | 521/129 |
| 3,382,302 | 5/1968 | Marzocchi | 264/257 X |
| 3,395,201 | 7/1968 | Kalwaites | 264/45.3 |
| 3,823,099 | 7/1974 | Doyle | 521/99 X |
| 3,860,371 | 1/1975 | Willy | 264/45.3 X |
| 3,867,494 | 2/1975 | Rood et al. | 264/45.3 |
| 3,895,159 | 7/1975 | Yoshimura | 264/45.3 X |
| 3,917,774 | 11/1975 | Sagane et al. | 264/45.3 X |
| 3,923,938 | 12/1975 | Poppe | 264/45.3 X |
| 3,931,098 | 1/1976 | Herweg et al. | 264/45.3 |
| 3,951,718 | 4/1976 | Gonzalez | 264/45.3 X |
| 3,960,999 | 6/1976 | Massie | 264/45.3 |
| 4,028,158 | 6/1977 | Hipchen et al. | 264/45.3 X |
| 4,028,289 | 6/1977 | Brown | 521/117 |
| 4,036,923 | 7/1977 | Saidla | 264/45.3 |
| 4,148,854 | 4/1979 | Cordts et al. | 264/45.3 |
| 4,211,848 | 7/1980 | Blount | 521/116 X |
| 4,216,294 | 8/1980 | Halle et al. | 521/99 |

FOREIGN PATENT DOCUMENTS

| | | |
|---|---|---|
| 576492 | 5/1959 | Canada . |
| 1504518 | 10/1969 | Fed. Rep. of Germany ..... 264/45.3 |
| 1808349 | 3/1970 | Fed. Rep. of Germany ..... 264/45.3 |
| 2244901 | 3/1973 | Fed. Rep. of Germany ..... 264/45.3 |
| 2276922 | 1/1976 | France ............................... 264/45.3 |
| 1028908 | 5/1966 | United Kingdom . |
| 1137465 | 12/1968 | United Kingdom . |
| 1174263 | 12/1969 | United Kingdom ............... 264/45.3 |

Primary Examiner—Philip E. Anderson

[57] ABSTRACT

A method of forming a synthetic article by open forming techniques by providing a fluid composition containing a predominant quantity of synthetic resin and having a capability for delayed, substantial gas evolution. To produce reinforced articles, the composition is applied to the reinforcement at a temperature below a predetermined gas evolution temperature and is subjected to fluid spreading conditions to thoroughly wet the elements of reinforcement. Subsequently, the fluid composition reaches the predetermined temperature, the resultant gas evolution effectively expands the composition while it remains in thorough wetting contact with the reinforcement elements, and the resin then solidifies and cures to produce an intimately reinforced, expanded article. In important embodiments the preponderant gas evolution results from the reaction of an organic hydroperoxide with an isocyanate in the presence of a surfactant. The invention is especially applicable to the expansion of polyester resins but has numerous other applications.

31 Claims, 18 Drawing Figures

METHOD OF OPEN FORMING AN EXPANDED POLYESTER RESIN ARTICLE INVOLVING A CONTROLLED INDUCTION PERIOD

FIELD OF THE INVENTION

This invention relates to forming synthetic articles by open forming techniques. This application is a continuation in part of application U.S. Ser. No. 111,664 filed Jan. 14 1980, now U.S. Pat. No. 4,358,548 and of U.S. Ser. No. 215,200, filed Dec. 10, 1980, now abandoned.

BACKGROUND OF THE INVENTION

Techniques for open forming of articles of synthetic resin encompass a number of different processes, e.g. spray-up, hand lay-up, centrifugal casting, open casting and multifilament winding, for preparing structural products, architectural decorative pieces, lamp bases, furniture parts, immitation marble sink tops, shower enclosures and tubs, boats, fluid tanks, microwave antennas, sewage pipes, etc.

Prior art foam systems are not generally used in such structural products, a major field, but are used mostly in the limited cases where a low density core or backer is desired for stiffening and similar purposes. In particular, polyester resin, which has many advantages in rigid structural parts, has not been effectively utilized in expanded state.

In a typical product that does have a foam layer, used e.g. as a substitute for balsa or plywood, the foam layer, typically of quite low density, is laminated to a preformed layer of fibreglass-reinforced, nonexpanded synthetic resin. Another nonexpanded layer may be provided on the other side of the low density layer. Each layer is applied to the mold separately. A finish gel coat, where used, typically is provided as the initial coating of the mold and is backed by a nonexpanded, separately applied resin layer prior to application of the low-density foam layer. Typically, foam is spaced well away from the finished surface and generally does not contain reinforcement fibres. If reinforcing fibres are used, the fibres are typically encapsulated in groups without being thoroughly penetrated and covered by the resin, and hence their reinforcement effect is relatively inefficient.

In certain foam systems that are used for cores, such as certain known urethane-foaming reactions, the ingredients must be combined stoichiometrically within a critical ratio of 1% by a precise mixing device. However, because such known reactions occur so quickly, it is necessary that the mixture be ejected from the device immediately. These considerations have caused known systems to employ accurate and expensive pumps, e.g. gear pumps, to deliver the ingredients at a smooth, precise and constant flow rate. The quick reactions of prior systems also make it necessary to provide solvent or mechanical purge systems to periodically flush or push reacted material out of the reaction chamber. This solvent handling and the purge cylinder add additional costs to apparatus to handle these systems.

Also inherent to the quick foaming reaction of certain prior systems is the fact that gelation does not occur quickly enough to form or preserve bubbles of uniform size and shape. The gas bubbles in these systems tend to become irregular and may be at or near the surface, thereby weakening it. This prevents use as finished surfaces and in direct support of gel coats.

Ideally a resin expansion system should be inexpensive and require inexpensive equipment, should utilize components that are nontoxic and have a long shelf life (both individually and when mixed with other resin system components), and should be capable of achieving a full range of cellular densities. It is desirable that the gas-generating components be capable of functioning over a non-critical range of proportions without harming or altering the composition of the product.

SUMMARY OF THE INVENTION

I have realized the unique desirability of providing an open-forming system that would permit a controlled induction period after mixing so that forming or resin spreading steps can be performed, followed by expansion of the composition. I realize that by providing such a delay, it will be possible, for instance, to form fibre reinforced parts in which "rollout" is employed, e.g. by passing a pressure roller over a deposit of resin and fibres to spread the fluid resin into intimate contact with the reinforcement to intimately wet the fibres and to remove air, and the subsequent expansion will then provide a unique expanded but still intimately reinforced product having a fine dispersion of wetted reinforcement fibres and a uniform dispersion of cellular voids of desirable size and distribution.

The invention features the method of providing a fluid composition containing a predominant quantity of synthetic resin, the composition having a capability for substantial gas evolution at a predetermined minimum elevated temperature level, the resin of the composition having a curing capability at temperatures above the predetermined level, applying the fluid composition to reinforcement elements at a temperature below the predetermined temperature, subjecting the fluid resin-containing composition and reinforcement elements to fluid spreading conditions that enable spread of the composition into thorough wetting contact intimately with the exposed surface of the reinforcement elements at a temperature below the predetermined temperature, and causing the fluid composition to reach the predetermined temperature after completion of the spreading to cause evolution of gas to produce expansion of the resin containing composition while the fluid composition remains in thorough wetting contact with the reinforcement elements, and to cure the resin after the gas evolution to produce an intimately reinforced, expanded article.

In preferred embodiments, the composition includes exothermically reactive components capable of reacting at room temperature, the components being present in predetermined quantity to cause the composition to reach the predetermined higher temperature after an initial delay of sufficient duration to allow completion of the fluid spreading step; the reinforcement elements are free to be moved within the applied fluid resin-containing composition, and the expansion of the composition is effective to produce a redistribution of the reinforcement elements through the cross-section of the cured resin as a result of the resin expansion; preferably the reinforcement elements are initially provided in the form of aggregations, the fluid spreading conditions are effective to cause the resin-containing fluid mixture to substantially penetrate and open up the aggregations and wet the surface of individual elements within the aggregations, and the expansion of the fluid composition is effective to spread apart the individual elements into a relatively more dispersed distribution through the fluid resin-containing composition prior to cure of the resin; the reinforcement aggregations comprise bundles of fibre filaments, the fluid spreading conditions are effective to cause the fluid resin-containing composition to penetrate the exterior of the bundles and wet the surfaces of the individual filaments, and the expansion is effective to spread apart the filaments in each bundle and move toward each other filaments of adjacent bundles to provide a more homogeneous distribution of reinforcing filaments of adjacent bundles in the cured resin, with resultant increased strength of the cured article; the interior portion of a layer of the resin-containing composition with the reinforcement elements rises to a higher temperature level than an outer portion of the layer to cause formation of more gas bubble volume in the interior portion relative to the outer portion prior to the cure whereby a variable apparent density reinforced resin layer is produced having lower apparent density in the region of the interior portion of the layer and higher apparent density in the outer portion, while the reinforcement elements are intimately bonded with the resin throughout; the resin-containing composition and reinforcement elements are applied to an open mold surface, the spreading conditions include the application of compacting force to the applied fluid composition to cause the resin to wet thoroughly the reinforcement elements and provide a layer comprised of resin and reinforcement in the shape of the mold surface, the subsequent expansion causes the exposed surface of the fluid layer to rise and thicken and the subsequent cure is effective to provide a reinforced layer with the resin bonded to substantially all of the surface of the reinforcement elements, the layer having, as a result of the expansion, a cross-sectional thickness greater than the thickness of the originally applied layer; the fluid resin-containing composition is applied to reinforcement by hand lay up techniques or a spray mixture of resin and chopped fibres is employed and the reaching of the predetermined temperature in either case is delayed for a period to enable fluid spreading by rolling of the fluid composition and reinforcement elements to provide substantial wetting of the reinforcement elements and to remove air from the applied mass; the system is used with centrifugal casting techniques in which resultant centrifugal force of the rotating mold is effective to cause the fluid spreading; or open casting with in-the-mold reinforcement is utilized in which the delay enables gradual gravity flow to wet the reinforcement before expansion; or the system is used with multi-filament winding formation techniques in which reinforcement is in the form of a strand of a multiplicity of filaments, the strand is drawn through a bath of the fluid composition thence into the air, and the strands are subsequently applied under tension about a mold surface, the tension application being effective to promote spreading of the fluid resin into intimate contact with individual filaments of the reinforcement prior to the expansion; the composition includes a combination of isocyanate and surfactant as an expansion agent and a reagent reactive with the isocyanate at the predetermined temperature to produce expansion gas, preferably the reagent is an organic hydroperoxide, and to produce a class A finish on a mold surface, the organic hydroperoxide has water and hydrogen peroxide levels below a weight ratio of about 1:25 combined water and hydrogen peroxide to active organic hydroperoxide components; the resin is polyester, the hydroperoxide is methyl ethyl ketone peroxide and a multivalent metal compound is included to also react with the methyl ethyl ketone peroxide to promote the cure of the polyester; the isocyanate and surfactant are present in the ratio of about 95 to 5 down to 85 to 15, respectively, by weight; the reagent reactive with the isocyanate is methyl ethyl ketone peroxide; the delay prior to expansion is at least three minutes; the composition includes a multivalent metal compound and the reagent includes a quantity of organic hydroperoxide sufficient to react with the isocyanate and the multivalent metal compound; preferably the composition includes an inhibitor for delaying exothermic generation of heat of the composition thereby to delay substantial gas generation reaction of the isocyanate and organic hydroperoxide for a period greater than three minutes, and preferably the resin is polyester.

Another aspect of this invention features a novel gas producing reaction to produce an expanded polyester product. In this aspect, the invention comprises dispersing an organic isocyanate in the presence of a surfactant, with an organic hydroperoxide in reactive quantities in a base resin composition comprised of polyester (including mixtures with other resins), depositing this dispersion upon a surface and, after suitable delay, allowing the isocyanate and organic hydroperoxide to react in deposited form while the resin composition is in a fluid state, to produce carbon dioxide, the proportions of all ingredients in the mixture being predetermined to assure that the preponderant quantity of $CO_2$ produced from the isocyanate results from this reaction. In the method preferably curing of the composition is initiated simultaneously with the gas producing reaction, with the reaction occurring before the gellation stage that would restrain expansion is reached, enabling formation of a distribution of cellular voids in the composition, preferably the organic hydroperoxide being present in excess quantities to serve as the catalyst for curing the resin. The surfactant is provided in the reactive mass to obtain proper cell quality.

For achieving the above results, preferably the reaction proceeds according to the formula:

wherein $R_1$ is an aryl group, and $R_2$, $R_3$ and $R_4$ are selected from the groups consisting of aryl and aliphatic groups, preferably $R1_1$, $R_2$, $R_3$ and $R_4$ being hydrocarbons. The residue, an amine oxide, preferably resides in the resinous mass in a cross-linked state at the cell boundaries and serves to strengthen the cured mass.

In preferred embodiments, the isocyanate is an aromatic isocyanate or has comparable reacivity, preferably the agent being methyl diphenyl isocyanate ("MDI"). The organic hydroperoxide is provided in a diluted form and is an alkyl hydroperoxide or methyl ethyl ketone peroxide ("MEKP"), preferably the latter. Advantageously the base resin has at least one polymerizable ethylenic unsaturation and the hydroperoxide is provided in such excess quantity as not only to provide the gas-producing reaction with the isocyanate, at the time of desired foaming, but also to serve as a curing agent for the resin immediately after the foaming has occured. The mixture can be formulated (e.g., by choice of amount and kind of surfactant) to produce closed cell products with $CO_2$ captured in the cells, (along or with other gases provided by other additives, e.g., for thermal insulation) or to be of open cell structure (e.g., by choice of surfactant) as for sound insulation. Similarly, the mixture can be formulated to produce rigid or flexible products as desired.

PREFERRED EMBODIMENT

The structure and operation of a preferred embodiment of the invention will now be described, after first briefly describing the drawings.

FIG. 1 is a side view, partially in section, of laminate produced according to the preferred embodiment, while

FIG. 2 is a representation of a microphotograph of an end view in section of fibre bundles in an expanded laminate produced by delayed gas formation according to the preferred embodiment, while

FIG. 4 is a similar representation of a microphotograph of an end view in section of fibre bundles in an undesirable laminate produced by prior non-delayed foaming systems, while

FIG. 6 is a side view, partially in section, of a representative spray gun device for employing the method of said preferred embodiment, while

STRUCTURE

Figure 1:
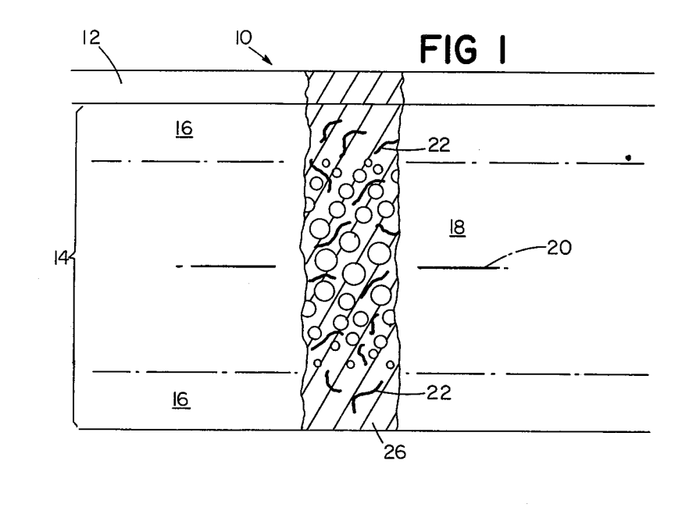

In FIG. 1, a laminate product 10 produced according to the preferred embodiment is shown in cross section. Gel coat 12, typically 0.020 inches thick, is a pigmented resin that is applied to the surface of the mold and cured prior to application of the expansion composition.

Figure 1A:
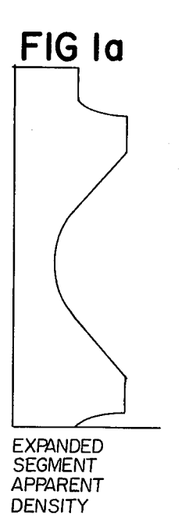
Figs. 1a, 1b, 1c and 1d are representative profiles of combined apparent density, apparent resin density, apparent fibre density and average cell diameter, respectively, taken along the cross section of FIG. 1.
Figures 1B, 1C:
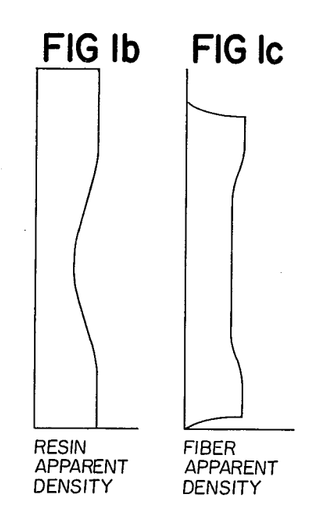
Figure 1D:
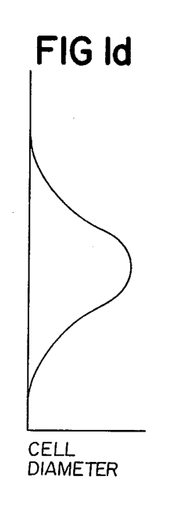

The cured, expanded polyester segment 14, typically 0.250 inch thick, of the laminate product 10 which has been applied as a single layer of the expansion composition, is comprised of an initial skin 16 at both surfaces, typically 0.040 inch thick, where little or no gas formation has occurred (due to the relatively cooler conditions at these surfaces during the exothermic gas generating reaction) and an expanded center segment 18, typically 0.170 inch thick. The expanded segment 18 has differential apparent density (FIG. 1a), with the lowest density along the neutral axis 20 through the center. This profile of apparent density is caused by differential temperature within the material during the expansion process, the higher temperatures along neutral axis 20, causing the gas generation to be stronger along the axis and thereby create larger and more gas bubbles (FIG. 1d). The profile of apparent density of the fibre reinforcement (FIG. 1c) is also lower along neutral axis 20 because the gas bubbles force some of the fibre-carrying resin away from the axis, but the variation of the apparent density of the reinforcement across segment 14 is less pronounced than the variation of apparent density of the resin (FIG. 1b). (The gel coat layer 12 is not reinforced so the fibre density in that section is, of course, zero.)

Figure 6:
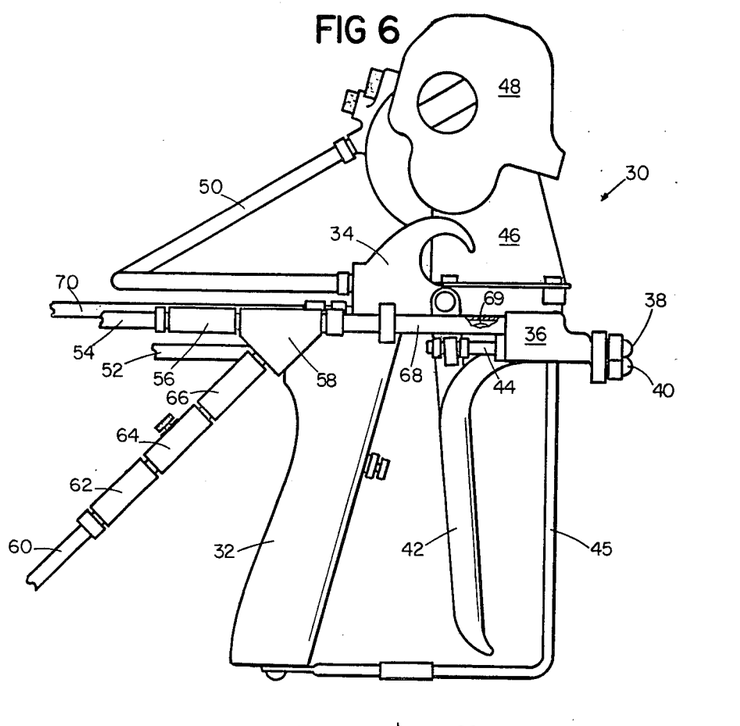
Figure 7:
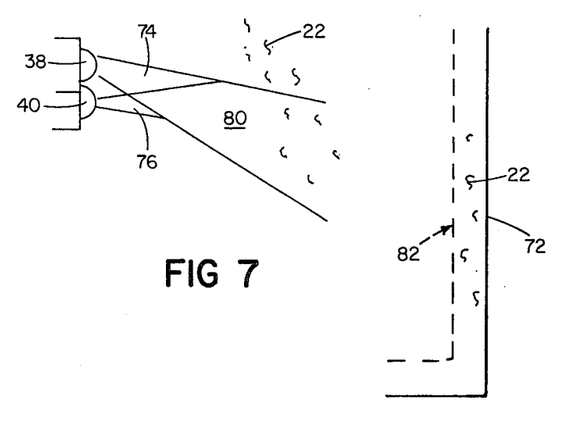
FIG. 7 is a perspective view of the application of the composition with said device to a mold surface.

Reinforcing fibres 22, shown representatively in FIGS. 1 and 7, are shown in microphotograph representations in FIGS. 2–5. The reinforcement is typically provided to the process as a strand comprising a bundle of sixty individual filaments bound, for handling, by a phenolic resin binder, each filament being a glass fibre 0.002 inch thick. Chopped portions of the strand are deposited with the resin composition during spray-up by means of a spray gun-mounted chopper (48, FIG. 6) as discussed below.

Figure 4:
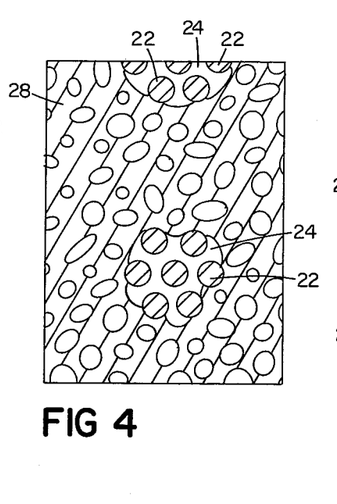
Figure 5:
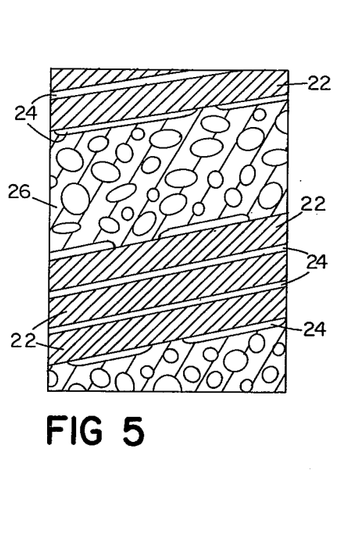
FIG. 5 is a side section view thereof.

In past attempts to provide a polyester foaming system, the gas generation occurs almost immediately to produce foam. If such a system were used with fibres it would not be possible to roll out the mixture to remove entrapped air 24 and wet out the reinforcing fibres 22. As shown in FIGS. 4 and 5, the fibres 22 in the bundle would remain close together and trap air 24. The fibres 22 would have minimal contact with the surrounding cured resin 26, existing essentially in an encapsulated state (not intimately wetted), and therefore would not be efficient in imparting strength to the article.

Figure 2:
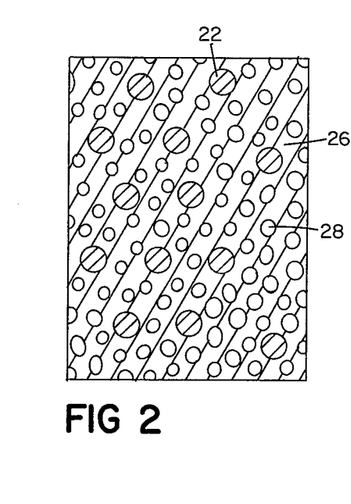
Figure 3:
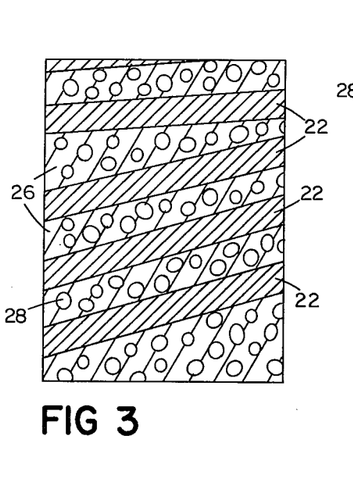
FIG. 3 is a side section view thereof.

In contrast, with the delayed gas forming system of the preferred embodiment, the resin mixture is maintained in its nonexpanded state for an extended period of time to allow the material to be rolled out to remove air and to allow the resin to penetrate and open up the bundles of the fibres, with intimate and thorough fibre wetting as shown in FIGS. 2 and 3. When the gas generating reaction does occur, the fibres 22 in the bundle are spread further apart by the formed gas bubbles 28 while remaining in wetted contact with the surrounding cured resin 26. Thus, the filaments of adjacent bundles form a more uniform dispersion. The resin cures with the fibres in dispersed condition, with intimate bond of the resin with the dispersed fibres as a result of the thorough wetting and removal of entrapped air, and a strong product can thus be obtained.

PROCESS

Referring now to FIG. 6, spray gun 30 for applying the composition ingredients is shown. Spray gun 30 is comprised of a handle 32 and body 34. Extending from the front of gun 30 is spray head 36 bearing spray nozzles 38, 40. Below body 34 and in front of handle 32 is trigger 42 attached to spray nozzle activator 44. About trigger 42 is located trigger guard 45. Above body 34, held by support 46, is fibre chopper 48 of known construction and operation, connected to air line 50 which is activated by trigger 42. Air to activate the chopper and also to atomize the catalyst/reactant component is supplied to the gun through air line 52. Resin delivery line 54 is connected to check valve 56 which is connected to Y-valve 58. Also connected to Y-valve 58 is a means for providing the second component comprised of a pump (not shown) supplying an organic isocyanate, e.g., methyl diphenyl isocyanate (M.D.I.), in turn through delivery line 60, back pressure valve 62, metering valve 64, and check valve 66. The pumps for the resin and isocyanate are of the relatively inexpensive piston type supplying a pulsating stream, of the type manufactured by Binks Manufacturing Co., Inc. of Chicago, Illinois. The check and metering valves are of the standard industrial hydraulic type, e.g., as supplied by Parker-Hannifan Corp., of Cleveland, Ohio. The back pressure valve is of the type supplied, e.g., by Binks. All are typically ¼ inch size. The Y-valve 58 is connected at its outlet to a mixer tube 68, containing a static mixing element 69, which in turn is connected to spray head 36. The resin and isocyanate lines, 54 and 60, respectively, which may additionally carry minor components, e.g., surfactants or metallic salts, if desired, thus convey the components to motionless mixer 68 which discharges within spray head 36 to spray nozzle 38. Also connected to spray head 36 and in turn to a separate spray nozzle 40 is reactant/catalyst delivery line 70 conveying an organic hydroperoxide.

The pumps deliver the resin at a pressure slightly below the pressure of the isocyanate to the Y-valve 58. Minor periodic variations of the type experienced with piston type pumps are not critical as the check valves 56, 66 prevent flow from Y-valve 58 into the inlet lines 54, 60 and variations in the mixing ratio due to pressure pulses are easily tolerated by the lack of close criticality for mixture proportions in the reaction. The pump systems for the resin and isocyanate may either be hydraulic units, i.e., airless, (8:1 to 50:1 pump ratio, driven by plant air at 40 to 100 psi for delivery at 1200 to 2500 psi) or air carried (4:1 to 8:1 pump ratio, for delivery at 200 to 400 psi). The catalyst may be supplied by a pressure bottle or tank at 40 to 80 psi, or by a slave pump.

To activate the system (FIG. 7) the nozzles 38, 40 are directed at a surface 72. This may be the inner layer of a gel coat, upon which expanded polyester is to be formed or it may be the mold surface itself, e.g. where a class A finish is to be formed, i.e. a surface ready for painting without the need for filling or grinding, or where the surface of the expanded material is not critical. Trigger 42 is depressed toward handle 32 thereby causing spray nozzle activator 44 to open nozzles 38, 40. Movement of trigger 42 also causes chopper 48 to activate. (Chopper 48 is a standard spray gun attachment known in the industry. To briefly describe the operation it chops preset lengths of reinforcing fibres bundle from a continuous strand bundle containing, e.g., 60 fibres. The chopper drive means expels the chopped bundles of fibres into the liquid stream from nozzles 38, 40, where they are carried to the surface.)

The resin flow rate is approximately 1½ to 2 gallons per minute where spray nozzle 40 has a 0.026 inch opening. The flow rate of isocyanate is controlled to a usual maximum of 20% of the resin flow rate by use of metering valve 64. Check valves 56, 66 prevent the material in Y-valve 58 from re-entering delivery lines 54, 60. The mixing that occcurs in Y-valve 58 is supplemented as the components pass through motionless mixing tube 68 where the static mixer induces further mixing.

The isocyanate/resin mixture spray 74 is emitted from nozzle 38 while the organic hydroperoxide catalyst spray 76 is emitted from nozzle 40 to mix externally of the gun in a spray state before engaging object 72 upon which expanded polyester is to be formed. Chopped strands 22 of glass reinforcement fibre are projected is short bundles into combined spray 80 before the spray engages object 72. The gun is moved back and forth in a painting motion to progressively deposit the layer to the desired thickness, typically 0.080 to 0.250 inch. The initial passes typically do not include fibres to a thickness of about 0.015 inch, to prevent unwetted fibres from resting against the mold surface.

The component mixture 82 on surface 72 is now rolled to mix the components, to release entrapped air, and to wet-out and distribute the fibre reinforcement. After a period of time, predetermined by the ingredient ratios and ambient conditions, the desired gas-operating temperature of the layer is reached and the gas forming reaction occurs to expand the resin and separate and redistribute the fibres, and the heat of the gas forming reaction helps the resin to subsequently cure in its expanded state.

It is speculated that bubble formation also results in desirable strength producing orientation of the fibre bundles. It has been found that the expanded product shows unexpected improved performance in tests for flexural modulus, i.e. deflection versus load for a given thickness, and flexural strength, i.e. point of failure versus load, again for a given thickness. The presence of a "back bone" of strong amine oxide (see below) that results from the gas evolution reaction is believed to contribute to such strength performance.

THE PREFERRED GAS GENERATING REACTION

As mentioned, an organic isocyanate and an organic hydroperoxide are reacted to produce gas, chiefly found to be carbon dioxide ($CO_2$), and a resinous residue. The residue is identified as an amine oxide polymer, from the following reaction that is believed to occur:

$$R-N=C-O + H-O-O-R' \longrightarrow CO_2 + \underset{H}{\overset{R}{N}}-O-R'$$

(Isocyanate)    (Hydroperoxide)    (Gas)    (Amine Oxide)

Examples of suitable isocyanates are aromatic isocyanates, (and isocyanates having a reactivity comparable to aromatic isocyanates e.g. aliphatic isocyanate e.g. ethylene bis(4-cylcohexol isocyanate)), including monoisocyanates, e.g. n-butyl isocyanate, phenyl isocyanate (although these are much less preferred due to their dangerously high reactivity, particularly in the presence of water or hydrogen peroxide impurities); diisocyanates, e.g. tolylene diisocyanates, diphenyl methane diisocyanates (methyl diphenyl isocyanate or "MDI"), napthalene diisocyanates, phenylene diisocyanates; triisocyanates, e.g. triphenylmethane triisocyanates; and polymeric polyisocyanates. Suitable hydroperoxides include alkyl hydroperoxides such as cumene hydroperoxide and butanone hydroperoxide (methyl ethyl ketone peroxide or "MEKP"). Both reactants may be present as a monomer or as various polymeric homologues.

Because of being less reactive and easier to handle it is highly preferred to employ such material as MDI. In any event the presence of undesirable ingredients in the organic hydroperoxide, i.e. water and hydrogen peroxide, is limited to prevent side reactions before the proper gas expansion reaction. The weight ratio of the total water and hydrogen peroxide to the active components of the organic hydroperoxide should be less than 1:25 for the formation of nonporous surfaces, i.e. skins, on the expanded product, which are of particular importance in many applications, and to achieve the often desirable Class A finish (such as desired for autobody exterior parts).

The reaction between the organic isocyanate and the organic hydroperoxide is exothermic and proceeds at ambient conditions to reach the gas-generating temperature, e.g. 95° F. in a 50 gram cup, and then to evolve substantial quantities of $CO_2$ to produce a polymeric residue that is frothy, highly cross-linked, non-melting (i.e., thermoset), has a high service temperature, is a good insulator, has high compressive strength and is resistant to common solvents and weathering. When difunctional reactants are used (e.g., MDI or MEKP), one or both of the functional groups of each reactant may participate in the reaction, depending, for example, on stearic hindrance present in the molecule.

EXAMPLES OF THE PREFERRED GAS GENERATING REACTION

In order to provide an example of the gas generating capability of the two preferred components, a series of reactions was observed using different weight ratios of the components. The specific isocyanate reactant used was a commercial MDI agent comprising MDI monomer and higher polymeric homologues (Mondur MR, from Mobay Chemical Co., Pittsburgh, PA). The hydroperoxide reactant used was a commercial MEKP agent comprising a 60 present solution of MEKP and higher polymeric homologues in an inert solvent, dimethyl phthalate (DDM from the Lucidol division of Pennwalt Corp., King of Prussia, PA). For each experiment, the two reactants were weighed into a 50 gram cup and mixed together at room temperature (about 68° F.) and ambient pressure for about 30 seconds. The resulting reaction was significantly exothermic, and built up over time to a temperature at which substantial quantities of gas evolved. The total evolved gas was then measured, as summarized in the following table:

TABLE 1

| Ratio by Weight of MDI Agent to MEKP Agent | ml of Gas per Gram of Mixture |
| --- | --- |
| 0.10 | 4.9 ml/g |
| 0.19 | 115.0 ml/g |
| 0.48 | 111.0 ml/g |
| 0.91 | 58.3 ml/g |
| 1.67 | 55.4 ml/g |
| 3.13 | 48.4 ml/g |
| 6.69 | 14.1 ml/g |
| 9.65 | 3.3 ml/g |

Figures 8, 9:
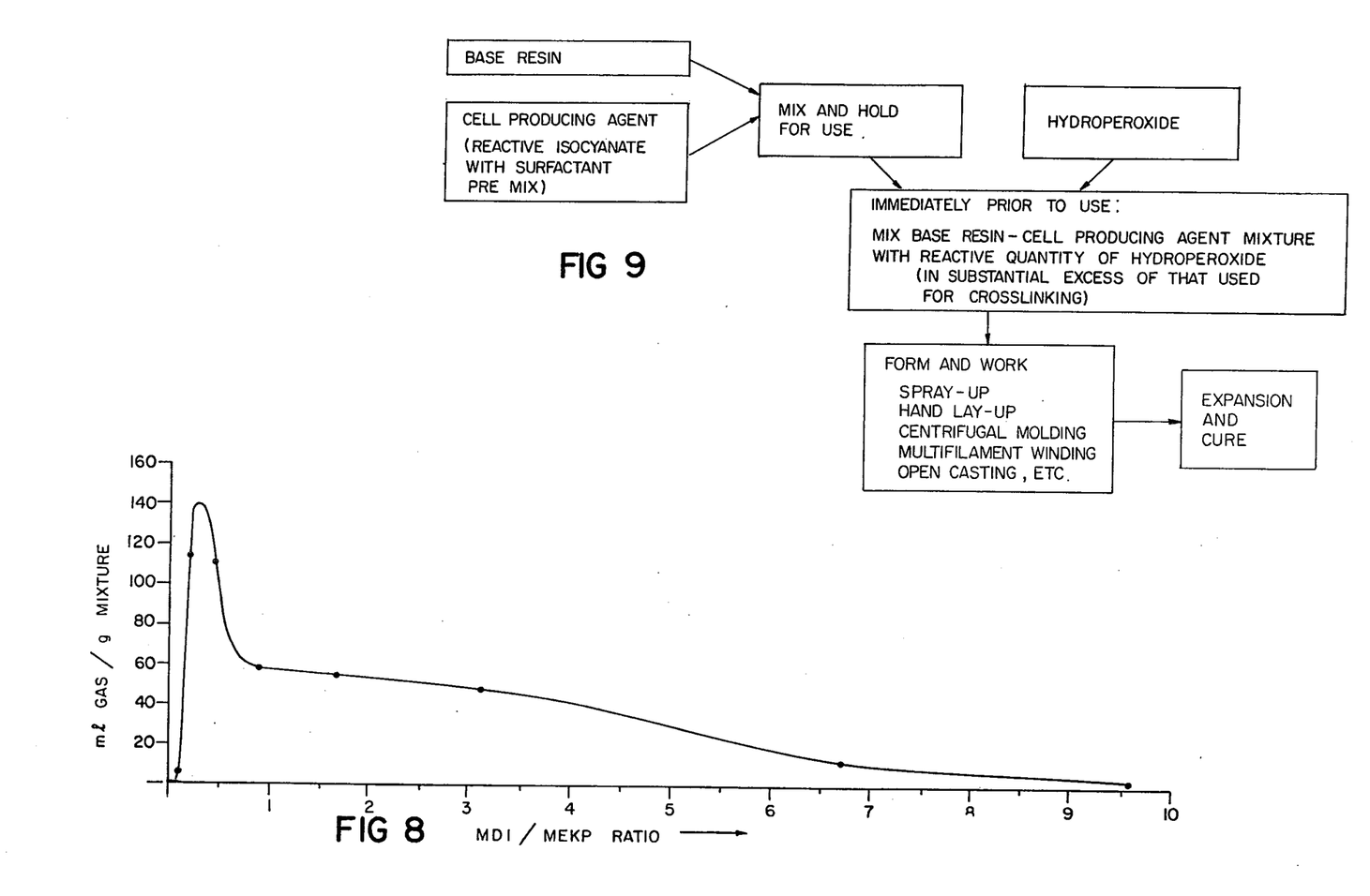
FIG. 8 is a curve depicting gas evolution from the reaction of various ratios of an isocyanate and hydroperoxide.
FIG. 9 is a flow diagram of a resin expanding sequence.

Those results are summarized in the graph of FIG. 8, showing that the gas evolved per gram of mixture peaks at about 140 ml/g mixture at an MDI to MEKP agent ratio between about 0.24 and 0.30. (When the weights used are corrected to remove the solvent weight, the maximum amount of gas evolved by the reactants increases to about 180 ml/g corrected mixture, which is within the range theoretically predicted by the reaction according to the above formula.)

The above gas generating reaction is advantageously used to expand various resins, e.g. polyester, vinyl esters, bis-phenyl A, silicone, epoxies, thermoset acrylics and, to show its potential versatility, will even foam other dissimilar material, e.g. motor oil or even cement. The gas generated can be controlled to produce a wide range of densities of products. Additionally, the reaction can be used to produce a resinous product of microcellular composition that does not shrink during curing, or it can later be cured by various means. Because the resultant cell structure can be strong (and strengthened by the amine oxide reaction product) the reaction can be employed to extend resins in high density applications, e.g., 30 lbs/ft$^3$ to 60 lbs/ft$^3$, and thus can supplant use of special extenders such as preformed glass spheres added to resin.

USE OF THE PREFERRED GAS GENERATING REACTION IN AN UNSATURATED POLYESTER RESIN SYSTEM TO PRODUCE AN OPEN-FORMED PRODUCT

The unsaturated polyester resin may be prepared by the condensation of an unsaturated dicarboxylic acid, such as maleic or fumaric acid; with a glycol or mixture of glycols, such as ethylene glycol; propylene glycol; 1,4-butanediol; 1,6-hexanediol; or diethylene glycol. Saturated acids, e.g. phthalic acid, sebacic acid, or adipic acid, are sometimes included in the composition to reduce the amount of unsaturation in the final product, making it more flexible and tougher. In many instances it is desirable to use a polyester resin which is substantially free of hydroxyl groups or carboxyl groups; that is, the resin has a hydroxyl number of less than 15, preferably less than 10 and most preferably substantially zero; and an acid (carboxyl) number of less than 15, preferably less than 10, and most preferably substantially zero, but higher hydroxyl and/or higher carboxyl resins are operable, according to the invention, because all components are mixed together simultaneously and immediately dispersed. In such cases a polyisocyanate may be used, and the final product may contain amide, urea or urethane linkages. In the case of a polyester base resin, the resulting product may be a polyester urethane.

There is customarily added to the unsaturated polyester resin a vinylic monomer. This vinylic monomer serves as a solvent or diluent for the unsaturated polyester resin and as a co-monomer therefor. Such vinylic monomers are usually referred to as cross-linking agents for the unsaturated polyester resin. Examples of such cross-linking monomers are styrene and dialkyl phthalate.

Referring to FIG. 9, expansion of an unsaturated polyester resin is preferably accomplished by first providing a mixture of the reactive isocyanate and a surfactant. The surfactant, which is used to control the size and size distribution of cell-forming bubbles, can be any suitable agent (preferably non-ionic) that adjusts the surface tension to promote the desired cell formation when hydroperoxide is reacted with the isocyanate. To make a commercially available premixed expander, a low hydroxyl surfactant, non-reactive with isocyanate is prepared, with ratio of isocyanate to surfactant between about 95 to 5 down to 85 to 15, respectively, by weight. Preferably a silicone such as a polyoxyalkylene polysiloxane polymer is employed. (Such premixed expander has a long shelf life.)

Figure 14:
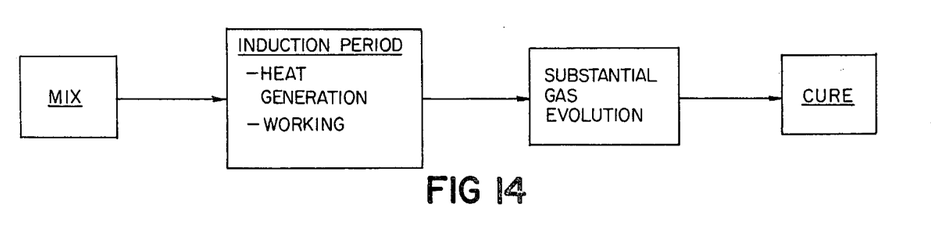
FIG. 14 is a block flow diagram of the reaction of the preferred embodiment.

Referring to FIG. 9 (and more generally to FIG. 14), at the time expansion is desired a reactive quantity of hydroperoxide is admixed with the base resin-isocyanate-surfactant mixture. For the gas-formation reaction to take place, the hydroperoxide is added in substantial excess over that which may be consumed in cross-linking or curing of the polyester resin. (Typically ¾ to 2 percent of the dilute hydroperoxide, relative to base resin, is used for curing; generally a larger fraction of the added hydroperoxide will be employed in the isocyanate reaction than in the curing action.) The reaction between the organic isocyanate and the organic hydroperoxide initiates at room temperature to generate heat and the gas evolution reaction of the isocyanate and the hydroperoxide, in the presence of the surfactant, is noted at an exothermic temperature of about 95° F. (measured in a 50 gram cup). By suitable adjustment of ingredients the induction period (between mixing of the organic hydroperoxide and the organic isocyanate and the principal gas evolution reaction) with gradual temperature increase and negligible gas evolution can be extended up to thirty minutes where extensive spreading action or mechanical working of the composition is desired. The curing reaction between the organic hydroperoxide and the polyester resin at the end of this period occurs at about 140° F., again measured in a 50 gram cup. A side reaction will also occur between the hydroperoxide and multivalent metal promoters, e.g. cobalt napthenate, which are included in most resins as a processing aid, during the induction period to generate additional heat for attaining the temperature at which the gas evolution reaction occurs.

As gas is evolved from the reactants, the resinous mass expands and the excess hydroperoxide serves to gel and cure the polyester. The timing of the gas evolution and gellation can be regulated (as by choice of the quantity of promoter, see below) such that gas evolution substantially precedes the degree of gellation that would restrain expansion. The gas will thus form the desired voids throughout the resin, and these will be maintained as the resin soon proceeds to cure. The resulting cured resin is a solid of fine uniform cell size. Examination under magnification reveals a brownish substance in the cell structure. It is believed that this substance, an amine oxide polymer reaction product, contributes (e.g., as a reinforcing "lining" or "back bone") to the strength of the cell walls.

Advantageously, the system does not interfere with curing of the resin, the system is simple and can be used with conventional equipment, and no special temperatures or handling is required to avoid explosions, toxic effects or degradation.

The resulting product has the advantageous properties of a polyester resin, and the product can be made essentially free of amide, urea or urethane linkages (e.g., by appropriately limiting the hydroxyl and carboxyl content of the resin used.)

EXAMPLES OF EXPANDING AN UNSATURATED POLYESTER RESIN

The following examples of expanding and curing of an unsaturated polyester resin were observed using the commercial MDI (isocyanate) and MEKP (hydroperoxide) products described above (Mobay's Mondur MR and Lucidol's DDM, respectively.) The resin used in each case was Reichold Chemical's 31-001 orthophthalic polyester resin to which 0.15 percent, by weight, of a 6 percent cobalt napthenate promoter was added. The MDI was present as a mixture of 95 percent, by weight, of the commercial MDI product mentioned above and 5 percent surfactant (L-5340, a silicone surfactant from Union Carbide Co.). This MDI-surfactant was combined with the resin in ratios of 10, 15 and 20 percent by weight of mixture to resin. The resulting combination was then reacted with the commercial, diluted MEKP product described above, in a range from 3 to 10 percent by weight of the dilute MEKP agent to total reaction mixture. The reaction began at room temperature (about 68° F.) and ambient pressure. After an induction period of about six minutes the isocyanate-hydroperoxide (exothermic) reaction proceeded. The cobalt-hydroperoxide exothermic interaction is believed to have occurred somewhat simultaneously. The $CO_2$ evolved and the resin continued to expand until the exothermic temperature reached about 140° F. (measured in a 50 gm. cup), at which time gellation occured. The density of the resulting free-rise products was measured. The results are summarized in the following table:

TABLE 2

| Free Rise Expanded Polyester % (Weight) MDI-Surfactant Mixture of Resin | | | | |
| --- | --- | --- | --- | --- |
| | | At 10% Density | At 15% Density | At 20% Density |
| Weight Dilute | 3% | 49.0 lbs/ft$^3$ | 34.3 lbs/ft$^3$ | 29.8 lbs/ft$^3$ |
| MEKP, as Percentage | 4% | 41.3 lbs/ft$^3$ | 31.1 lbs/ft$^3$ | 22.9 lbs/ft$^3$ |
| Of Weight of | 5% | 33.1 lbs/ft$^3$ | 27.7 lbs/ft$^3$ | 16.7 lbs/ft$^3$ |
| The Combined | 6% | 22.8 lbs/ft$^3$ | 20.1 lbs/ft$^3$ | 11.4 lbs/ft$^3$ |
| Resin and MDI | 7% | 17.2 lbs/ft$^3$ | 12.9 lbs/ft$^3$ | 9.1 lbs/ft$^3$ |
| Surfactant | 8% | 11.5 lbs/ft$^3$ | 7.6 lbs/ft$^3$ | 4.8 lbs/ft$^3$ |
| Mixture | 10% | 8.6 lbs/ft$^3$ | 5.7 lbs/ft$^3$ | 3.4 lbs/ft$^3$ |

The above examples were chosen to ensure compatibility with existing equipment—e.g., considering the limits of typical pumping equipment for peroxides. By controlling temperature, additional density control is possible; for example, Table 2 shows that using the 10 percent MDI-surfactant/resin ratio, with 7 percent of the dilute MEKP, starting at room temperature, yields a product having density of 17.2 lbs/ft$^3$. By increasing the starting temperature of the mixture to 100° F., a density of 5.7 lbs/ft$^3$ has been achieved.

The range of densities can be increased further to provide a very low density expanded product (e.g., 2 to 4 lbs/ft$^3$) using a low-shrink additive such as a vinyl ester, methyl methacrylate or Union Carbide LP-60. Higher density (e.g., up to the 60 to 70 lbs/ft$^3$ range) can be achieved by decreasing the ratio of ingredients and by cooling the reactant mixture. In particularly high density applications the reactants are provided to produce minute or microcellular voids in a substantially continuous solid resinous article (apparent density of the resin component of the order of 60 to 70 lbs/ft$^3$) to counteract sink marks or shrinkage during curing.

The amount of promoter is restricted to prevent premature gellation that would restrain expansion (e.g., in the system above the cobalt napthanate solution is preferably restricted to less than 0.3 percent, preferably less than 0.2 percent by weight of the base resin).

Further examples of the use of the invention for molded expanded polyester products are as follows:

EXAMPLE A

A laminate product with a class A finish, i.e. an essentially imperfection-free surface ready for finish coating without requiring filling or grinding, as required for exterior parts in the automotive industry, was prepared by combining in the spray gun described above the following components: Koppers polyester resin 1010-5; Aerosil 200, a fumed silica thixotropic agent employed to prevent drainage and provide nucleation sites; an expansion agent premixture, which consisted of a ratio of 90 percent, by weight, commercial MDI product described above and 10 percent of a low hydroxyl surfactant nonreactive with the isocyanate (Dow Corning DC-193); and an organic hydroperoxide that is low in percentage of water and hydrogen peroxide (impurities present as result of the manufacturing process), e.g. Pennwalt/Lucidol Lupersol DDM/9 which is 50%, by weight, methyl ethyl ketone peroxide (MEKP) with no more than about 0.7 percent, by weight, water and 0.7 percent, by weight, hydrogen peroxide. The resin and the Aerosil 200 were combined in one tank in a ratio of 100 grams of resin to 0.75 grams of Aerosil 200. The isocyanate/surfactant mixture was provided in a second tank. Both mixtures were pumped to the spray gun as earlier described with the isocyanate/surfactant metered to enter the mixing chamber in a 1:10 ratio, by weight, to the resin. The MEKP was provided to the gun at a rate of two grams for one hundred grams of resin. The MEKP and the resin-isocyanate-surfactant mixture were directed toward the mold surface from the gun from separate nozzles to mix externally. After a first pass producing a layer about 0.015 inch thick, the chopper was activated to project reinforcing fibres into the component stream to provide strength to the finished article. After a layer about 0.187 inch thick had been deposited on the mold, the material was manually rolled out by means of a roller to work the composition and force out air tubbles, and further wet the fibres. After the roll-out was completed, i.e. after a delay of about six minutes, the composition exothermically reached its gas generation temperature, produced gas, and expanded to about 0.250 inch and then cured in this expanded state. Examination of a cross section of the material revealed that a skin with no voids had formed at each surface to a depth of approximately 0.040 inch. The surface against the mold had a smooth finish substantially without voids or imperfections. Between the two skins, the resin contained cellulur voids of generally spherical form, with high uniformity, but with some gradual variation in apparent density, i.e. bubble size and number, with lowest apparent density of the resin mass in the center.

EXAMPLE B

In this example, the mold was prepared with a surface layer of pigmented resin that was cured to a thickness of 0.020 inch, i.e. a gel coat. The composition was prepared and applied as in example A above. The finished product had an expanded layer similar to that seen in Example A, with a skin formation approximately 0.040 inch thick against the gel coat. The skin was essentially free of voids or gas bubbles that could weaken the support given the gel coat.

OTHER EMBODIMENTS

Other embodiments are within certain teachings of the invention. For example, the surfactant may be introduced with the base mass of resin, instead of or as well as with the isocyanate. Also, other types of systems may be used to apply the composition, e.g., hand lay-up, vacuum bag molding, or compression molding. The thickness of the skin may also be controlled or even eliminated, where desired, by heating the contacting surfaces to induce gas generation throughout the cross section.

Open molding techniques for forming reinforced articles that may be employed are described in the following examples and figures.

Figure 10:
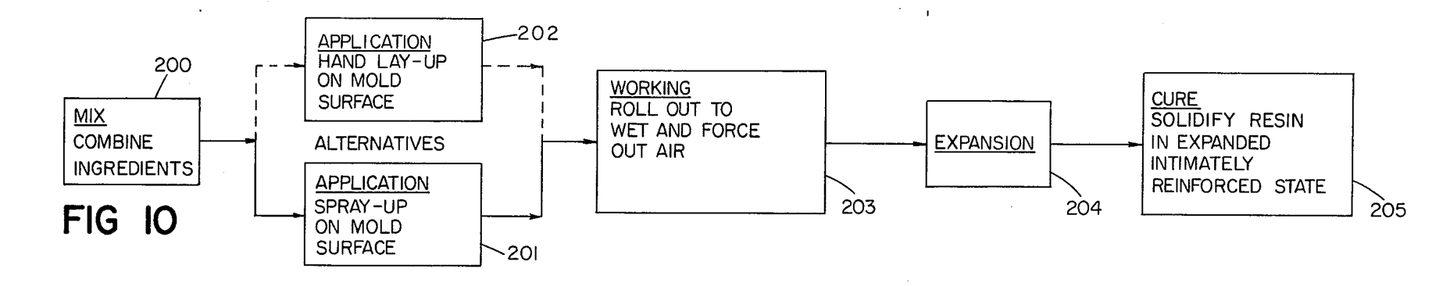
FIGS. 10, 11, 12, and 13 are block flow diagrams of manufacturing processes according to the process of the invention.
Figure 11:
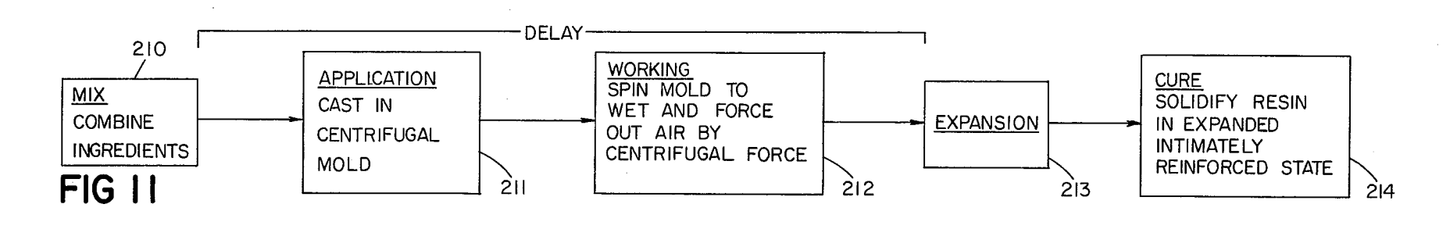
Figure 12:
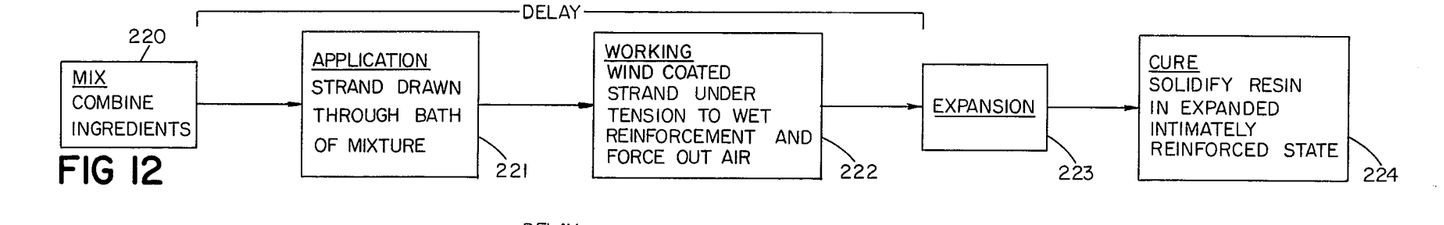

To prepare the expansion composition for forming articles by hand lay-up, spray-up, centrifugal molding and multifilament winding processes described in respect to FIGS. 10–12, the ingredients of Example A (in the same proportions) were combined by means of a gear mixer. The composition was then applied and worked by the described procedures.

FIG. 10 is a flow diagram of the preferred spray-up and hand lay-up processes. The ingredients are combined 200 and applied to a surface, e.g. a gel coat or a mold surface, by hand 202, e.g. pouring the composition onto the surface, or by spray 201. The material is subjected to fluid spreading conditions 203 on the surface, e.g. by means of working the material with a roller, to squeeze out air and wet the reinforcement (which may be included in the mixture, or be layed into the mold). The gas evolution reaction is delayed by the formulation of the mixture and the absence of external heat to allow time for this working to take place. After the predetermined period of time, i.e. until the temperature of the composition reaches about 95° F. and the reaction of the isocyanate-organic hydroperoxide has passed through its induction phase, the composition expands 204, and subsequently cures 205 in the expanded state, intimately reinforced by the wetted out fibres, and exhibiting a Class A finish.

FIG. 11 is a flow diagram of a centrifugal casting technique wherein the ingredients are mixed 210 and are cast in a centrifugal mold 211. The composition is worked 212, to cause the fluid to spread and wet the fibres and force out air, by rotation of the mold during the delay period. The composition subsequently expands 213 and is cured 214, and exhibits a Class A finish.

FIG. 12 is a flow diagram of a multifilament strand winding process, e.g. to produce fluid tanks, etc., wherein the ingredients are mixed 220 and placed in a bath through which a strand, i.e. a continuous bundle of typically 60 filaments, is drawn 221. The strand is drawn through a ring to remove excess material (which also serves to partially wet the individual fibres) and the strand is continuously wrapped 222 under tension about a mold. The compression of the bundles against one another, as a result of the winding tension, in the presence of the fluid composition, causes the fluid to spread and complete the wetting of the fibres and force out air. The composition subsequently expands 223 and cures 224.

The highly efficient mixing achieved by spraying or by use of gear mixers results in immediate and intimate contact between the reactants for better and faster reaction. Where less efficient mixing means, e.g. blade mixers, are employed to mix the components for hand lay-up, centrifugal molding and multifilament winding processes, the reaction between the isocyanate and the organic hydroperoxide is depressed due to the competition of the hydroxyl sites available in most commercial resins. To overcome this mixer inefficiency, the proportion of DDM/9 must be increased, e.g. to three grams per one hundred grams of resin to produce finished product expanded to twice the volume of the unexpanded composition, to four grams per one hundred grams of resin for a product expanded to two-and-one half times the unexpanded volume.

Figure 13:
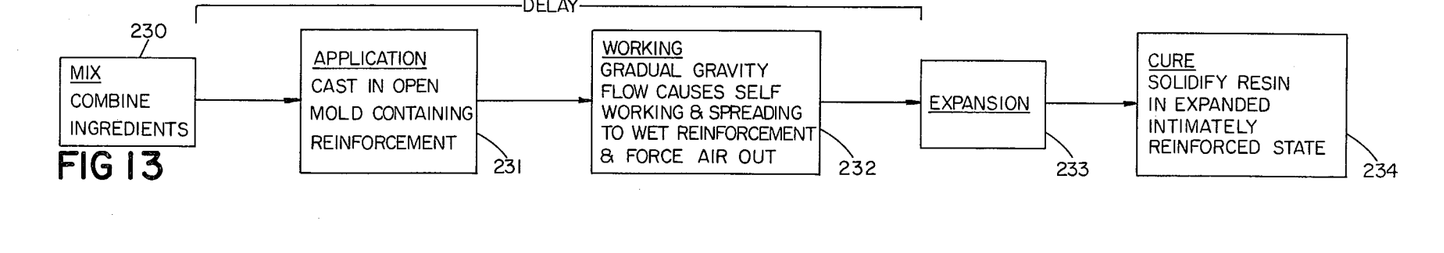

FIG. 13 shows a flow diagram for an open mold casting technique wherein the ingredients are mixed 230 and cast 231 into an open mold containing reinforcing elements. In this technique, the material is not physically worked 232 but gravitational forces serve to produce gradual gravity flow to spread the material, force out air and wet the in-the-mold reinforcement. Again, the composition subsequently expands 233 and cures 234.

EXAMPLE C

To prepare an expansion composition for forming by an open casting process, fifty grams of Reichhold polyester resin 31-001 were combined with fifty grams of alumina (Solem LV-336), a heat sink, resin extender and nuclearation site former; 0.3 grams of a multivalent metal (cobalt napthanate); five grams of the expansion agent premixture described in Example A, and two grams of MEKP (DDM/9). The composition was poured into an open mold containing fibre reinforcement, during the six minute period of induction it settled and spread to wet the reinforcement and force out the air, and subsequently it expanded and cured. The finished article had a density of 40 pounds per cubic foot, excluding the density of the reinforcement, and a Class A finish.

OTHER SOURCES OF HEAT

The heat necessary to reach the gas evolution temperature may also be provided externally at least in part, e.g. by infrared radiant heating of the resin, by heating the mold wall, or by microwave, in which microwave radiation penetrates the composition to interact with dipole molecules of the composition where, e.g. no bivalent metal promoter is present.

In another embodiment, the expansion gas reaction may be made to occur between an isocyanate and a potassium compound, e.g. potassium octoate, after the desired delay, without the presence of an organic hydroperoxide. In this embodiment of the system, the resin curing reaction is brought about by the presence of benzoyl peroxide with a promoter, e.g. dimethyl aniline. The benzoyl peroxide and the promoter react to generate heat, which in turn causes a reaction between the isocyanate and the potassium octate to evolve carbon dioxide. The benzoyl peroxide acts to cure the resin after about six minutes, or longer if an inhibitor, e.g. hydroquinone, is used. The two reactions, i.e. the heating reaction and the gas evolving reaction, occur independently and therefore must be carefully controlled to cause the reactions to occur with the proper timing, e.g. by limiting the amount of potassium to less the 1%, by weight, of the mixture. The resultant product has high impact resistance and may be used, e.g. to produce a non-shrink, patching compound, e.g. for auto body repair work.

EXAMPLE D

One hundred grams of Reichhold polyester resin 30-1830 was combined with 0.2 grams of dimethyl aniline (DMA); one gram of potassium octoate; two grams of Lucidol benzoyl peroxide ATC paste, a high temperature polyester cure promoter; and ten grams of the expansion agent premixture described in Example A. The reaction was allowed to proceed as described above and produced an expanded polyester article with high impact resistance.

EXAMPLE E

One hundred grams of Freeman Chemical polyester resin XP40A173-97 and 0.3 grams of dimethyl aniline were combined with a mixture of two grams of Lucidol benzoyl peroxide ATC, two grams of DDM/9 MEKP, ten grams of the expansion agent premixture of Example A, and one hundred twenty grams of talc (as an extender and nucleation site former). The composition went through an induction/delay period during which the MEKP reacted with the isocyanate and the benzoyl peroxide reacted with the dimethyl aniline to generate heat without evolution of significant amounts of gas. When the exothermic heat reached approximately 95° F., the isocyanate and MEKP reacted to generate substantial volumes of carbon dioxide gas and additional heat. When the composition's exothermic temperature reached 140° F., the benzoyl peroxide reacted with the resin to gel and cure the expanded article.

OTHER RESIN SYSTEMS

Various other resin systems may be expanded according to the invention, for example:

EXAMPLE F

In this example a laminate product was formed by expanding a base mass resin comprised of epoxy. The base resin, General Electric Arnox 3000, a one-component, heat-curing epoxy, was combined with the expansion agent premixture of Example A, and DDM/9 (the low hydrogen peroxide, low water MEKP supplied by Lucidol) in a weight ratio of 100 grams:5 grams:3 grams. The composition was applied to a mold surface in a thin layer of about 0.125 inch to which reinforcement fibres were added and the mass was worked from time to time over the period of fifteen minutes. After that period gas evolution and expansion of the resin was noted. The mold was heated to about 350° F. to cause the composition to cure in the expanded state.

In another example using the same composition, the material was applied to the mold in a thick layer, about 0.250 inch thick, and worked over the period of twenty minutes. The gas evolved to expand the resin which was cured in the expanded state by placing the mold and composition in an oven.

EXAMPLE G

In this example, "Devcon 5 minute" epoxy, a two component system, was combined with the expansion agent and the DDM/9 MEKP in a weight ratio of 100 grams:10 grams:3.5 grams. The mixture was applied to a mold surface and worked. Composition expansion was noted after about three minutes. The article then cured in the expanded state.

EXAMPLE H

In this example, the gas evolving reaction system was used to produce expanded articles of silicone rubber compound. The base resin, General Electric RTV 700 silicone rubber, was combined with Beta 5 silicone curing agent, the premixed expansion agent of Example A, and DDM/9 MEKP in a weight ratio of 100 grams:10 grams:10 grams:3 grams. The composition was applied to a mold surface and had a working time (comparable to gel time in rigid plastics) of about 20 minutes, and cured in an expanded state.

EXAMPLE I

In another example of expanding silicone rubber, Dow Corning 3112 RTV silicone rubber was combined with Dow Corning Catalyst #4 (a silicone curing agent), the premixed expansion agent of Example A, and the DDM/9 MEKP in a weight ratio of 200 grams:1 gram:20 grams:6 grams. The composition began to expand after about 8 minutes and had a working time of about 20 minutes. The article again cured in the expanded state.

OTHER APPLICATIONS

In applications where the surface of the finished article is less critical, e.g. for cores or backers, the system may employ ingredients with a higher level of water or hydrogen peroxide impurities present.

EXAMPLE J

In this example, a laminate product similar to that in Example A was formed, but without the requirement of a class A type finish, e.g. for cores, backers or pool liners, where the best surface is not required. The ingredients and procedure were the same as Example A above, but the DDM/9 low water and low hydrogen peroxide MEKP was replaced with another MEKP, i.e. DSW/9 which had 27 percent water and 7 percent hydrogen peroxide, by weight. The mixing and application with the spray gun were as above. The finished product had a rough, porous surface that was unacceptable for surface or surface supporting applications.

In other cases, the ingredients may be subjected to special processing prior to being included in the system. For example, under very special processing conditions, certain aspects of the invention may be employed with polyurethane as the predominent resin component of the open formed article. Polyurethanes are formed by reaction, on a 1:1 ratio, of an A-component, typically a polyester polyol or polyether polyol, and a B-component, an isocyanate. The polyols typically contain a high percentage of water due to manufacturing processes. For use in the expansion system, the polyol, typically a 30% unsaturated polyester polyol, must be highly evacuated to remove virtually all water, in order to attain delay of the required duration. The A- and B-components are then combined with an organic hydroperoxide and a polyurethane promoter, typically dibutyl tin dilaurate, of the type T-12 manufactured by M & T Chemical, of Rahway, N.J., and allowed to react according to the invention to produce expanded polyurethane articles. Briefly, the process involves reaction between the hydroperoxide and the polyol to break the unsaturated double bonds of the polyol to generate the heat necessary for the subsequent gas evolving reaction between the hydroperoxide and the isocyanate. The polyol and the isocyanate, promoted by the dibutyl tin dilaurate and the hydroperoxide react after the delay period to form the polyurethane and cure.

What is claimed is:

1. The method of forming an article of a base composition of synthetic resin, including at least a polyester resin, by open forming techniques, while producing carbon dioxide to expand said resin, said method comprising the steps of
providing said resin composition in fluid form;
dispersing an organic isocyanate, in the presence of a surfactant, with an organic hydroperoxide in reactive quantities in said resin composition to provide the capability at a predetermined elevated temperature of producing carbon dioxide within said composition and at a higher curing temperature to cure said resin;
at a temperature below said predetermined temperature, depositing said composition containing said dispersion upon a surface;
allowing said isocyanate and hydroperoxide to react in said dispersed, deposited form while said resin composition is in a fluid state to produce said carbon dioxide and expand said resin;
and thereafter allowing the expanded composition to reach said curing temperature to cure said resin;
the proportions of all ingredients in the composition and dispersion being predetermined to assure that the preponderant quantity of $CO_2$ produced from said isocyanate results from said reaction with said hydroperoxide.

2. The method of claim 1 wherein said composition includes exothermically reactive components capable of reacting at room temperature, including at least a metal compound reactive with said hydroperoxide, said components being present in predetermined quantity to cause said composition to reach said predetermined elevated temperature after an initial delay of sufficient duration to allow completion of a fluid spreading step.

3. The method of claim 1 adapted to produce a class A finish on a mold surface, wherein said organic hydroperoxide has water and hydrogen peroxide levels below a weight ratio of about 1:25 combined water and hydrogen peroxide to active organic hydroperoxide components.

4. The method of claim 1 wherein said isocyanate and surfactant are present in the ratio of about 95 to 5 down to 85 to 15, respectively, by weight.

5. The method of claim 1 in which the resin composition includes reagents selected to cause delay of substantial production of carbon dioxide for a period of at least three minutes after said dispersion step.

6. The method of claim 5 wherein said delay prior to expansion is at least three minutes, and said composition includes multivalent metal compound, and said reagent includes a quantity of organic hydroperoxide sufficient to react with said isocyanate and said multivalent metal compound.

7. The method of claim 6 in which said composition includes an inhibitor for delaying exothermic generation of heat of said composition thereby to delay substantial gas generating reaction of said isocyanate and said organic hydroperoxide for a period greater than three minutes.

8. The method of claim 1 wherein said resin composition is curable to pass through a gellation stage before reaching a solid state, said method including
initiating curing of said composition simultaneously with said gas-producing reaction, with the gas-producing reaction occurring before the gellation stage that would restrain expansion is reached, enabling the formation of a distribution of cellular voids throughout said composition,
and allowing the curing of said composition to proceed to completion in a manner substantially maintaining said distribution of cellular voids throughout the cured composition.

9. The method of claim 1 wherein said reactions proceeds substantially according to the formula:

wherein $R_1$ is an aryl group, and $R_2$, $R_3$, and $R_4$ are selected from the groups consisting of aryl and aliphatic groups.

10. The method of claim 9 wherein $R_1$, $R_2$, $R_3$, and $R_4$ are hydrocarbons.

11. The method of claim 1 wherein said isocyanate is an aromatic isocyanate.

12. The method of claim 11 wherein said isocyanate is methylene diphenyl isocyanate.

13. The method of claim 1, wherein said hydroperoxide is selected from the group cumene hydroperoxide and methyl ethyl ketone peroxide.

14. The method of claim 13 wherein said organic hydroperoxide is methyl ethyl ketone peroxide and a multivalent metal compound is included to also react with said methyl ethyl ketone peroxide to promote the cure of said polyester.

15. The method of claim 1, wherein said hydroperoxide is present in quantities in excess of the amount equivalent to said isocyanate, said resin has at least one polymerizable ethylenic unsaturation, and said excess hydroperoxide serves as a curing agent for said resin.

16. The method of claim 1 wherein all reactants are substantially free of hydroxyl and carboxyl groups and the resultant product is essentially free of urea, urethane or amide linkages.

17. The method of claim 1, comprising
reacting said isocyanate and organic hydroperoxide in quantities to produce a distribution of microcellular carbon dioxide voids throughout a substantially solid resinous mass, the resin and microcellular void portions of the cured article having an apparent density equal to at least 95% of the resinous mass prior to said gas generation.

18. The method of claim 1 wherein said reaction is effective to deposit an amine oxide through said resin.

19. The method of claim 1 adapted to form an expanded synthetic, reinforced article by open forming techniques, said method further comprising
applying said fluid composition to said surface in the presence of reinforcement elements at a temperature below said predetermined temperature,
by means of a spreader such as a roller, subjecting said fluid composition and reinforcement elements to fluid spreading conditions that enable spread of said composition into thorough wetting contact intimately with the exposed surface of said reinforcement elements at a temperature below said predetermined temperature,
and causing said fluid composition to reach said predetermined temperature and higher curing temperature after completion of said spreading to cause expansion and cure of said resin-containing composition while said fluid composition remians in thorough wetting contact with said reinforcement elements to produce an intimately reinforced, expanded article.

20. The method of claim 1 wherein said reinforcement elements are free to be moved within said applied fluid resin-containing composition, and said expansion of said composition is effective to produce a redistribution of said reinforcement elements through the cross-section of said cured resin as a result of resin expansion.

21. The method of claim 20 wherein
said reinforcement elements are initially provided in the form of aggregations,
said fluid spreading conditions are effective to cause said resin-containing fluid mixture to substantially penetrate and open up said aggregations and wet the surface of individual elements within said aggregations, and
said expansion of said fluid composition is effective to spread apart said individual elements into a relatively more dispersed distribution through said fluid resin-containing composition prior to cure of said resin.

22. The method of claim 21 wherein said reinforcement aggregations comprise bundles of fibre filaments, said fluid spreading conditions are effective to cause said fluid resin-containing composition to penetrate the exterior of said bundles and wet the surfaces of said individual filaments, and said expansion is effective to spread apart the filaments in each bundle and move toward each other filaments of adjacent bundles to provide a more homogeneous distribution of reinforcing filaments of adjacent bundles in the cured resin, with resultant increased strength of the cured article.

23. The method of claim 19 including depositing said composition on a mold surface having a temperature below said predetermined temperature thereby to cause an interior portion of a layer of said resin-containing composition with said reinforcement elements to rise to a higher temperature level than an outer portion of the layer contacting said mold surface, thereby to cause formation of more gas bubble volume in said interior portion relative to said outer portion prior to said cure whereby a variable apparent density reinforced resin layer is produced having lower apparent density in the region of the interior portion of said layer and higher apparent density in said outer portion, while said reinforcement elements are intimately bonded with said resin throughout.

24. The method of claim 19 wherein said resin-containing composition and reinforcement elements are applied to an open mold surface, said spreading conditions include the application of compacting force to said applied fluid composition to cause said resin to wet thoroughly said reinforcement elements and provide a layer comprised of resin and reinforcement in the shape of said mold surface,
said subsequent expansion causes said exposed surface of said fluid layer to rise from said mold surface and the subsequent cure is effective to provide a reinforced layer with said resin bonded to substantially all of the surface of said reinforcement elements and having, as a result of said expansion, a cross-sectional thickness greater than the thickness of the originally applied layer.

25. The method of claim 24 wherein said fluid resin-containing composition is applied by hand lay-up techniques and the reaching of said predetermined temperature is delayed for a period to enable fluid spreading by rolling of said fluid composition and reinforcement elements to provide substantial wetting of said reinforcement elements and to remove air from the applied mass.

26. The method of claim 24 wherein said fluid resin-containing composition is applied by spraying in which reinforcement fibres accompany said composition as it is deposited on said mold surface and the reaching of said predetermined temperature is delayed for a period to enable fluid spreading by rolling of said composition resin and reinforcement elements to provide substantial wetting of said reinforcement elements and to remove air from the deposited mass.

27. The method of claim 24 wherein said mold surface rotates and resultant centrifugal force is effective to cause said fluid spreading.

28. The method of claim 24 wherein said reinforcement is in the form of a strand of a multiplicity of filaments, said strand is drawn through a bath of said fluid composition thence into the air, and said strands are subsequently applied under tension about a mold surface, said tension application being effective to promote spreading of said fluid resin into intimate contact with individual filaments of said reinforcement prior to said expansion.

29. The method of claim 19 wherein said resin and reinforcement are open-formed by either a hand lay-up, spray-up, centrifugal casting, open casting or multifilament winding forming technique.

30. The method of forming an article of a base composition of synthetic resin according to claim 1 by spray application of said composition, said method comprising, supplying the ingredients of said composition to a manual applicating device, said isocyanate being provided in pre-prepared agent with a surfactant for adjusting the cell characteristics in said resin, mixing the resin and the pre-prepared cell producing agent within said device, ejecting said ingredients from said device toward said surface upon which said article is to be formed, combining said resin and said isocyanate continuously with said organic hydroperoxide before contact with said surface, during the delay of the reaction of said ingredients rolling said composition in engagement with the surface, thereby removing air bubbles, and additionally mixing the ingredients before the expansion reaction takes effect.

31. The method of claim 30 wherein, to form an unexpanded portion, the flow of said isocyanate from said device is stopped, and the flow of said organic hydroperoxide from said device is reduced relative to the flow of said resin, said hydroperoxide and said resin combining before contacting said surface and reacting to cure said resin.

* * * * *

UNITED STATES PATENT AND TRADEMARK OFFICE
CERTIFICATE OF CORRECTION

PATENT NO. : 4,476,076

DATED : October 9, 1984

INVENTOR(S) : Glen W. Saidla

It is certified that error appears in the above-identified patent and that said Letters Patent is hereby corrected as shown below:

Column 9, line 30, "For each experiment," should start a new paragraph.

Column 13, line 24, "tubbles" should read -- bubbles --.

Column 19, line 55, "remians" should read -- remains --.

Signed and Sealed this

Fourteenth Day of May 1985

[SEAL]

*Attest:*

DONALD J. QUIGG

*Attesting Officer*     *Acting Commissioner of Patents and Trademarks*